Oct. 20, 1931.  C. DANTSIZEN  1,828,646
APPARATUS FOR AND PROCESS OF REMOVING SOOT
Filed Feb. 14, 1928
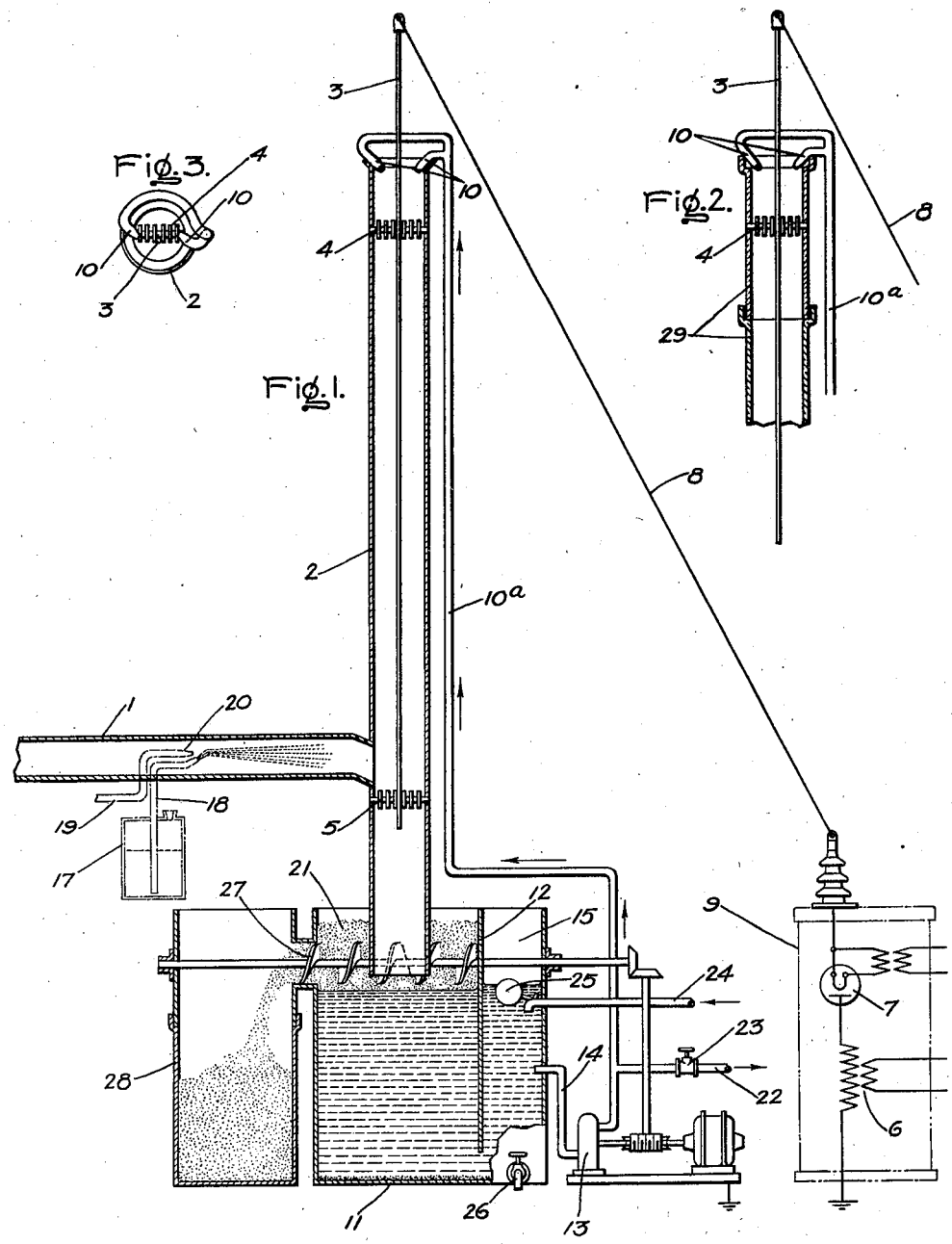
Inventor:
Christian Dantsizen,
by Charles E. Tullar
His Attorney.

Patented Oct. 20, 1931

1,828,646

UNITED STATES PATENT OFFICE

CHRISTIAN DANTSIZEN, OF SCHENECTADY, NEW YORK, ASSIGNOR TO GENERAL ELECTRIC COMPANY, A CORPORATION OF NEW YORK

APPARATUS FOR AND PROCESS OF REMOVING SOOT

Application filed February 14, 1928. Serial No. 254,315.

The present invention relates to the removal from gases of suspended matter, which for convenience will be referred to herein as "soot" regardless of whether or not such suspended matter originates from combustion. My invention, however, is particularly applicable to the removal of the soot resulting from the combustion of a carbonaceous material such as soft coal in furnaces, or in other words, to the prevention of smoke.

Soot has been successfully precipitated in industrial plants of various kinds by passing it between electrodes charged to high potentials, thereby causing the suspended solid particles to be drawn to one of the electrodes from which they were removed mechanically from time to time, for example, by scraping or vibrating the collector electrode.

An object of my invention is to provide an improved apparatus and method of operation utilizing a suitable conducting liquid, such as water, for carrying away the soot, which shall be economical in the use of water and require a minimum of attention whereby the field of use of smoke precipitators may be extended, for example, to heating plants for hotels, apartment houses, small factories, and the like.

In accordance with my invention, I have provided an apparatus and a process whereby the precipitated matter is collected by the cyclic circulation of a quantity of water, the solid matter being collected by flotation on the water from which it may be removed intermittently or continuously, without requiring special attendance or inconvenient apparatus. A small fraction of the water, which is used for collecting purposes, may be continuously withdrawn and fresh water supplied in its place without departing from my invention. The latter procedure is preferred when deleterious soluble products are taken up by the water from the flue gases, or soot.

The novel features of my invention will be set forth with greater particularity by the appended claims and for a better understanding of my invention reference should be made to the following specification and the drawings which show in Fig. 1 somewhat diagrammatically and partly in vertical section an apparatus embodying my invention; Fig. 2 is a fragmental view of a modification; and Fig. 3 is a top view of the apparatus shown in Fig. 1.

In the device shown in Fig. 1 the gases from which smoke to be treated is withdrawn from a flue or other source (not shown) by a conduit 1 and thence conducted to a precipitator comprising one or more stacks. Only a single stack 2 is shown in the drawings. The stack in the arrangement illustrated constitutes a collecting electrode the cooperating electrode being constituted by a rod 3 which is supported by insulators 4, 5 within the stack and preferably along the axis of the stack.

Suitable high potential current is supplied by a transformer 6, the secondary of which is connected in series with a rectifier 7 by the conductor 8 to the electrode 3, the opposite terminal of the secondary being connected to an enclosing oil-filled tank 9 which in turn is grounded as indicated thereby completing the connection to the grounded collecting electrode 2. This combination in the particular example illustrated furnishes a pulsating direct current.

When high potential current is applied to the electrodes 2 and 3, the electrode 2 preferably, but not necessarily, being made the positive electrode, the soot particles coming from a furnace or other source, are caused to be deposited by the electrostatic field on the collector electrode 2. The soot, instead of being deposited directly on the surface of the electrode 2, preferably is caused to be deposited upon a film of water which is directed over the interior of the stack by means illustrated as comprising nozzles 10 which are supplied by a conduit 10ª, and arranged to deliver water at the upper part of the stack. Soot, however, may deposit directly on the electrode 2 and subsequently may be flushed off by the water. The nozzles 10 preferably are directed to deliver the water tangentially as shown in Fig. 3 so as to cause a swirling and spreading of the water over the inside surface of the hollow electrode 2.

The current of water, carrying with it the deposited soot, is collected at the bottom end of the stack within a tank 11 which is provided with a vertical partition 12 extending to within a short distance of the bottom of the tank 11, thus leaving a space for the passage of water beneath this partition. Water is withdrawn by a pump 13 through a conduit 14 from the side chamber 15 between the partition 12 and the end of the tank 11 and is caused by the pump 13 to be recirculated through the conduit 10ª through the stack 2 thereby carrying soot particles into the main compartment of the tank 11.

The soot precipitated from the smoke derived from the combustion of soft coal is usually sufficiently oily in its nature to separate and float upon a body of water, even though the soot by itself without this film would sink in the water. In the case of solid particles separated from smoke which are not oily, sufficient oil should be introduced in the flue to render the particles immiscible in water. For example, I have shown in Fig. 1 in dotted lines a device for introducing oily matter into the gas or smoke admitted by the conduit 1. This device comprises a receptacle 17 containing oil which is injected into the conduit 1 through a tube 18, by an air current supplied by the tube 19, which terminates in the nozzle 20. In the case of the precipitation of smoke caused by the burning of soft coal this oil atomizer may be omitted.

The accumulation of the water carrying the soot particles into the main compartment of the tank 11 preferably should be chosen to be large enough so that water will remain in this compartment for a sufficient length of time to permit the soot particles to be flotationally separated from the water and to accumulate upon its surface as indicated at 21.

The combustion of soft coal also produces various soluble gases and soluble mineral matters together with the carbonaceous matter in the soot. The body of water used in the cyclic circulating system would become gradually charged with such soluble products and finally rendered unfit for use. I prefer, therefore, to continously remove a small fraction, say about one per cent of the circulating water by a bleeder pipe 22, the amount of wastage of water being controlled by a valve 23. The quantities of water thus withdrawn and otherwise lost are replaced through a pipe 24 which preferably is provided with a float valve 25 to automatically control the replacement of the water. From time to time the lower layer of water may be withdrawn through the cock 26.

I have illustrated in the drawings a screw conveyer 27 for skimming the accumulated bed of soot from the water and continuously discharging the accumulated soot particles into a can 28, but I wish it to be understood that this conveyer is shown merely as illustrative of any device suited for this purpose. In fact, in some cases the conveyer may be dispensed with and the soot particles allowed to flow by gravity into a receptacle or they may be removed manually from time to time when the accumulations have become sufficiently great to make the removal desirable.

As the stream of water flowing down the interior of the collecting stack 2 is of sufficiently high conductivity to constitute an electrode, it is not necessary that this stack should be made of conductive material. I have shown in Fig. 2 a fragmentary view illustrating a stack 29 consisting of sections of non-conducting material, as for example, vitreous or ceramic material, the actual electrode being constituted by a film of water discharged by the nozzles 10 upon the interior of this non-conducting stack. Electrical connection to ground is made through the supply pipe 10ª.

What I claim as new and desire to secure by Letters Patent of the United States is:

1. A smoke precipitation apparatus comprising means for introducing oil in atomized form into the smoke to be treated, means for precipitating soot in said smoke, means for carrying away the precipitated soot with water, and flotation means for separating the precipitated soot from the water.

2. The process of removing from a precipitation device oily smoke particles which are immiscible with water which includes carrying said particles away with water, accumulating said particles on the surface of the water, returning the water to the precipitation zone and discharging accumulated soot.

3. The process of removing from a precipitation device oily smoke particles which are immiscible with water which includes carrying said particles away by cyclically circulating water, and in the circulation cycle accumulating a quiescent pool of water to permit separation of said smoke particles by flotation.

4. The process of removing non-gaseous particles suspended in a gas which includes causing said particles to be deposited by an electrostatic field on a liquid in which said particles are substantially immiscible, and removing said particles from the surface of said liquid.

5. The method of removing oily solid particles from carbonaceous smoke which consists in electrically precipitating said particles, carrying away said particles by a liquid immiscible therewith, accumulating said particles on the surface of a deep pool of said liquid, and removing said accumulation from said pool.

6. The method of removing solid oily particles from smoke produced by the incomplete combustion of carbonaceous material which consists in electrically precipitating said particles in contact with a stream of water, recirculating the water in the precipitation zone, accumulating a body of said particles on a quiescent pool formed in the circulatory system, and mechanically removing said accumulation.

7. The method of removing solid particles from smoke which consists in providing said particles with a film of oil, precipitating said oil-coated particles on water, accumulating said precipitated particles on a quiescent pool of said water and mechanically removing the same.

8. An apparatus for removing oily solid particles from smoke comprising means for electrically precipitating said particles, carrying the precipitated particles away by a current of liquid in which said particles are immiscible, a reservoir for receiving said liquid when charged with said particles, said reservoir having an outlet below the surface thereof to permit withdrawal of liquid while being of sufficient size to permit accumulation of particles on the surface of said liquid in said reservoir and for skimming said accumulated particles.

9. An apparatus for removing solid particles from smoke comprising means for electrically precipitating said particles flushing said particles by a current of liquid in which said particles are immiscible, a reservoir for receiving said liquid when charged with said particles, said reservoir having an outlet below the surface thereof to permit withdrawal of liquid and being of sufficient size to permit accumulation of particles on the surface of said liquid in said reservoir and a conveyor for removing said accumulated particles.

In witness whereof, I have hereunto set my hand this 13th day of February, 1928.

CHRISTIAN DANTSIZEN.